US012294137B2

(12) United States Patent
Sayama et al.

(10) Patent No.: US 12,294,137 B2
(45) Date of Patent: May 6, 2025

(54) ANTENNA SYSTEM FOR VEHICLES

(71) Applicant: AGC Inc., Tokyo (JP)

(72) Inventors: Toshiki Sayama, Tokyo (JP); Hideaki Shoji, Tokyo (JP); Yusuke Kato, Tokyo (JP); Shoichi Takeuchi, Tokyo (JP)

(73) Assignee: AGC INC., Tokyo (JP)

(*) Notice: Subject to any disclaimer, the term of this patent is extended or adjusted under 35 U.S.C. 154(b) by 97 days.

(21) Appl. No.: 17/944,860

(22) Filed: Sep. 14, 2022

(65) Prior Publication Data

US 2023/0019268 A1 Jan. 19, 2023

Related U.S. Application Data

(63) Continuation of application No. PCT/JP2021/011457, filed on Mar. 19, 2021.

(30) Foreign Application Priority Data

Mar. 24, 2020 (JP) ................................ 2020-053160

(51) Int. Cl.
*H01Q 1/22* (2006.01)
*H01Q 1/12* (2006.01)
(Continued)

(52) U.S. Cl.
CPC ........... *H01Q 1/1271* (2013.01); *H01Q 1/325* (2013.01); *H01Q 9/0407* (2013.01); *H01Q 25/005* (2013.01)

(58) Field of Classification Search
CPC .... H01Q 1/1271; H01Q 1/325; H01Q 9/0407; H01Q 25/005; H01Q 19/005; H01Q 21/28
See application file for complete search history.

(56) References Cited

U.S. PATENT DOCUMENTS 5,918,183 A * 6/1999 Janky ........................ H01Q 1/32 343/717
10,389,042 B2 8/2019 Kim et al.
(Continued)

FOREIGN PATENT DOCUMENTS

DE 10-2010-064086 A 6/2012
JP 2002135025 A * 5/2002 ............... H01Q 1/22
(Continued)

OTHER PUBLICATIONS

International Searching Authority, "International Search Report," issued in connection with International Patent Application No. PCT/JP2021/011457, dated Jun. 8, 2021.
(Continued)

*Primary Examiner* — Hai V Tran
*Assistant Examiner* — Bamidele A Immanuel
(74) *Attorney, Agent, or Firm* — Foley & Lardner LLP

(57) ABSTRACT

An antenna system for vehicles includes a first antenna attached in a vicinity of a windshield of a vehicle; and a second antenna attached in a vicinity of a rear glass of the vehicle, wherein the first antenna and the second antenna are configured to transmit and receive an electromagnetic wave in a predetermined frequency band F, and wherein defining a region A and a region B with respect to a vehicle center axis extending in a traveling direction of the vehicle, so as to bisect a vehicle width of the vehicle from a viewpoint in a direction normal to a horizontal plane, the first antenna is arranged in the region A, and the second antenna is arranged in the region B.

9 Claims, 9 Drawing Sheets

(51) Int. Cl.

| | |
|---|---|
| ***H01Q 1/32*** | (2006.01) |
| ***H01Q 9/04*** | (2006.01) |
| ***H01Q 25/00*** | (2006.01) |

(56) References Cited

U.S. PATENT DOCUMENTS

| | | | | |
|---|---|---|---|---|
| 2005/0052334 | A1* | 3/2005 | Ogino | H01Q 9/30 343/866 |
| 2005/0122262 | A1* | 6/2005 | Ahn | H01Q 21/061 342/359 |
| 2005/0231432 | A1* | 10/2005 | Tsurume | H01Q 9/30 343/711 |
| 2006/0172712 | A1* | 8/2006 | Sievenpiper | H04B 7/0814 455/101 |
| 2007/0001915 | A1* | 1/2007 | Kono | H01Q 1/1271 343/713 |
| 2008/0291097 | A1* | 11/2008 | Fukushima | H01Q 1/1271 343/700 MS |
| 2010/0045547 | A1* | 2/2010 | Kono | H01Q 1/1271 343/712 |
| 2015/0229500 | A1* | 8/2015 | Suzuki | H04B 7/10 375/219 |
| 2017/0301981 | A1* | 10/2017 | Niihara | H01Q 1/3275 |
| 2018/0175492 | A1* | 6/2018 | Sasaki | H01Q 1/3208 |
| 2019/0237866 | A1* | 8/2019 | Kiyokawa | H01Q 1/48 |
| 2020/0036078 | A1* | 1/2020 | Sayama | H01Q 9/16 |
| 2021/0036412 | A1* | 2/2021 | Kodama | H01Q 19/005 |
| 2021/0091480 | A1 | 3/2021 | Sampo | |
| 2021/0242578 | A1* | 8/2021 | Inomata | H01Q 13/206 |

FOREIGN PATENT DOCUMENTS

| | | | | | |
|---|---|---|---|---|---|
| JP | 2006173895 | A | * | 6/2006 | H01Q 21/06 |
| JP | 2006-314071 | A | | 11/2006 | |
| JP | 2007281611 | A | * | 10/2007 | H04B 1/16 |
| JP | 2009071769 | A | * | 4/2009 | H01Q 19/22 |
| JP | 2009147557 | A | * | 7/2009 | H01Q 1/32 |
| JP | 5796159 | B2 | * | 10/2015 | H01Q 1/32 |
| JP | 2017-034657 | A | | 2/2017 | |
| JP | 2018-074371 | A | | 5/2018 | |
| WO | WO-2012/084844 | A2 | | 6/2012 | |
| WO | WO-2019/163521 | A1 | | 8/2019 | |
| WO | WO-2019/208453 | A1 | | 10/2019 | |
| WO | WO-2020/182563 | A1 | | 9/2020 | |

OTHER PUBLICATIONS

International Searching Authority, "Written Opinion," issued in connection with International Patent Application No. PCT/JP2021/011457, dated Jun. 8, 2021.

* cited by examiner

ANTENNA SYSTEM FOR VEHICLES

CROSS-REFERENCE TO RELATED APPLICATIONS

This U.S. non-provisional application is a continuation application of and claims the benefit of priority under 35 U.S.C. § 365(c) from PCT International Application PCT/JP2021/011457 filed on Mar. 19, 2021, which is designated the U.S., and is based upon and claims the benefit of priority of Japanese Patent Application No. 2020-053160 filed on Mar. 24, 2020, the entire contents of which are incorporated herein by reference.

BACKGROUND OF THE INVENTION

1. Field of the Invention

The present disclosure relates to an antenna system for vehicles.

2. Description of the Related Art

In recent years, there is an ongoing trend of expansion of services using high-speed and large-capacity wireless communication systems using GHz (gigahertz) bands, such as the transition from 4G LTE (800 MHz band) to 5G (sub-6). Specifically, the bandwidth used for such services tends to expand from the 3 GHz band to the 5 to 6 GHz band. Further, attempts have been made to spread wireless communication systems using frequency bands than higher sub-6 (e.g., 28 GHz band, 40 GHz band, 60 GHz band, and 80 GHz band).

As such a wireless communication system, an antenna system that includes an antenna for vehicles capable of transmitting and receiving electromagnetic waves in a 5G (sub-6) frequency band (for example, see International Publication No. 2019/208453) has been disclosed.

However, demand has been increasing for achieving higher levels both for improvement in antenna gain over all horizontal plane directions centering around a vehicle, and for wider-angle directivity.

SUMMARY

According to an embodiment in the present disclosure, an antenna system for vehicles includes a first antenna attached in a vicinity of a windshield of a vehicle; and a second antenna attached in a vicinity of a rear glass of the vehicle, wherein the first antenna and the second antenna are configured to transmit and receive an electromagnetic wave in a predetermined frequency band F, and wherein, defining a region A and a region B with respect to a vehicle center axis extending in a traveling direction of the vehicle, so as to bisect a vehicle width of the vehicle from a viewpoint in a direction normal to a horizontal plane, the first antenna is arranged in the region A, and the second antenna is arranged in the region B.

DESCRIPTION OF THE PREFERRED EMBODIMENTS

In the following, embodiments according to the present disclosure will be described with reference to the drawings.

According to the techniques in the present disclosure, an antenna system for vehicles that can make improvement in antenna gain compatible with wider-angle directivity in horizontal plane directions, can be provided.

Note that in each embodiment, a deviation is allowed in a direction such as parallel, right-angled, orthogonal, horizontal, vertical, up-down, left-right, or the like to an extent that the effect of the present inventive concept is not impaired. An X-axis direction, a Y-axis direction, and a Z-axis direction represent a direction parallel to the X-axis, a direction parallel to the Y-axis, and a direction parallel to the Z-axis, respectively. The X-axis direction, the Y-axis direction, and the Z-axis direction are orthogonal to each other. An XY plane, a YZ plane, and a ZX plane respectively represent a virtual plane parallel to the X-axis direction and the Y-axis direction, a virtual plane parallel to the Y-axis direction and the Z-axis direction, and a virtual plane parallel to the Z-axis direction and the X-axis direction.

As an antenna system for vehicles according to the present disclosure, a system that is capable of transmitting and receiving electromagnetic waves in a frequency band of sub-6 (less than 6 GHz) in a fifth generation mobile communication system (5G) will be mainly described, although the frequency band is not limited to sub-6. An antenna system for vehicles according to the present disclosure may be a system that is capable of transmitting and receiving electromagnetic waves, even in 5G, in the SHF (Super High Frequency) band from 3 GHz to 30 GHz, and further, in the EHF (Extremely High Frequency) band from 30 GHz to 300 GHz also known as millimeter waves in the art.

Figure 1:
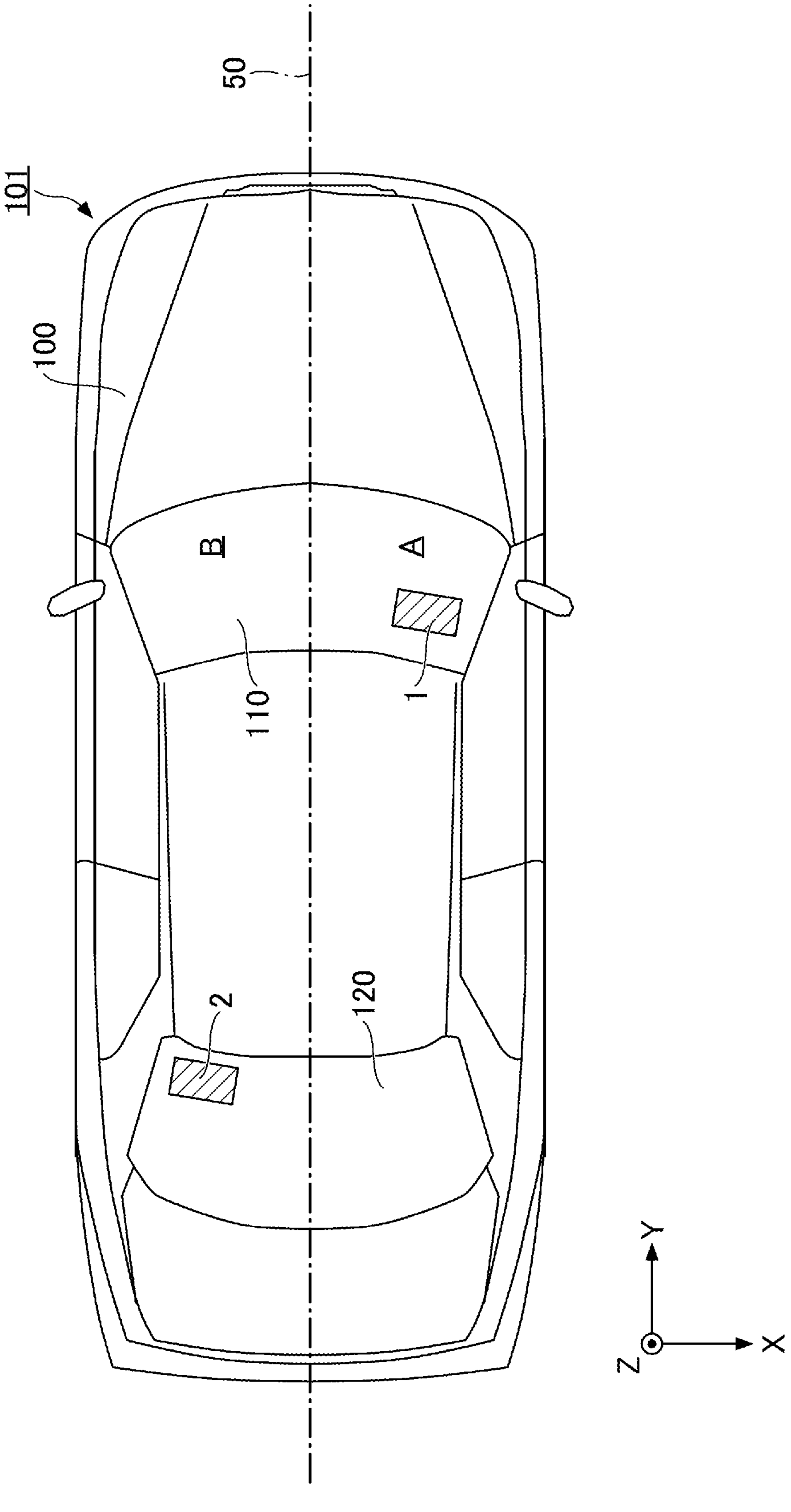
FIG. 1 is a top view illustrating an example of a vehicle having an antenna system for vehicles installed.

FIG. 1 is a top view illustrating an example of a vehicle that has an antenna system for vehicles installed according to an embodiment in the present disclosure. The top view corresponds to a view from a viewpoint in a direction normal to a horizontal plane (ground). The antenna system 101 for vehicles illustrated in FIG. 1 is an example of an antenna system for vehicles that includes multiple sets of antennas provided on or in the vicinity of dielectrics located on both front and rear sides of a vehicle 100. As the dielectric, glass, resin, and the like may be enumerated.

Note that in the drawings, the X-axis direction corresponds to the vehicle width direction of the vehicle 100, the Y-axis direction corresponds to the front-rear direction (traveling direction) of the vehicle 100, and the Z-axis direction corresponds to the up-down direction of the vehicle 100. Also, the XY plane corresponds to the horizontal plane, and the Z-axis direction corresponds to a direction normal to the horizontal plane (vertical direction).

FIG. 1 is a schematic diagram of the antenna system 101 for vehicles illustrating an example of an arrangement of multiple antennas provided in the vicinity of window glasses on both front and rear sides of the vehicle 100. A first antenna 1 is provided in the vicinity of a windshield 110 as a dielectric on the front side of the vehicle 100, and a second antenna 2 is provided in the vicinity of a rear glass 120 as a dielectric on the rear side of the vehicle 100.

Also, on the XY plane in FIG. 1, an imaginary line that is parallel to the Y-axis direction and passes through the center of the vehicle 100 in the vehicle width direction as the X-axis direction is defined as a vehicle center axis 50. In addition, the vehicle 100 is divided into two regions of a region A and a region B by the vehicle center axis 50 as the boundary line. More specifically, the first antenna 1 is installed in the vicinity of the vehicle interior side of the windshield 110 in the region A. Note that "the first antenna 1 is installed in the region A" specifically indicates that a conductor (conductor surface) with which the antenna 1 transmits and receives electromagnetic waves is arranged in the region A, and for example, a housing that supports the conductor is not included. In other words, in this case, only part of the housing that supports the first antenna 1 and does not contribute to transmission and reception of electromagnetic waves may be arranged in the region B.

The second antenna 2 is installed in the region B. More specifically, the second antenna 2 is installed in the vicinity of the vehicle interior side of the rear glass 120 or in the vicinity of the vehicle exterior side of the rear glass 120. Here, in the case where the vehicle 100 has an aerodynamic body part (exterior component) such as a rear spoiler positioned at substantially the same height as the roof, and the aerodynamic body part is attached to the vehicle exterior side in the vicinity of the rear glass 120, the vicinity of the vehicle exterior also includes, for example, an arrangement in which the second antenna 2 is installed inside the aerodynamic body part. Further, as in the case of the first antenna 1, "the second antenna 2 is installed in the region B" simply means that a conductor (conductor surface) with which the second antenna 2 transmits and receives electromagnetic waves is arranged in the region B; for example, only part of the housing that supports the conductor and does not contribute to transmission and reception of electromagnetic waves may be arranged in the region A.

The first antenna 1 and the second antenna 2 are formed to be capable of transmitting and receiving electromagnetic waves in a predetermined frequency band included in a range of, for example, higher than or equal to 3 GHz and lower than or equal to 100 GHz. Further, the first antenna 1 and the second antenna 2 can transmit and receive electromagnetic waves in a predetermined frequency band F included in the above range. For example, as the predetermined band of the antenna system 101 for vehicles in the case where 5.9 GHz is included in the frequency band F, a range from 5.850 GHz to 5.925 GHz may be considered, and in this case, the range can be applied to inter-vehicle communication or the like in V2X (Vehicle to Everything) and in C-V2X (Cellular Vehicle to Everything).

Also, it is favorable that the first antenna 1 is the only antenna that transmits and receives electromagnetic waves in the predetermined frequency band F in the vicinity of the of the windshield 110, and the second antenna 2 is the only antenna that transmits and receives electromagnetic waves in the predetermined frequency band F in the vicinity of the rear glass 120, because the antenna system 101 for vehicles can be simplified.

Figure 2:
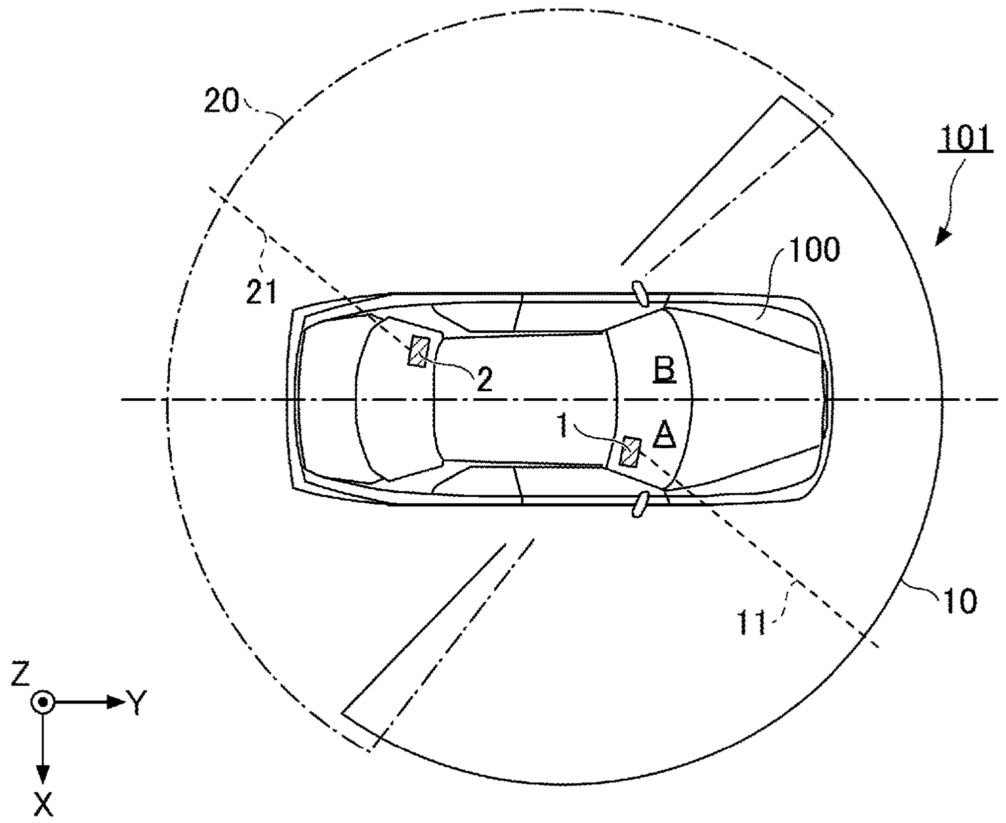
FIG. 2 is a diagram illustrating an example of directivities of antennas as viewed from above a vehicle.

FIG. 2 is a schematic diagram of the antenna system 101 for vehicles illustrating that directions of main beams 11 and 21 of the first antenna 1 and the second antenna 2 are different from each other as viewing the vehicle 100 in the direction normal to the horizontal plane. The main beams 11 and 21 mean beams in directions in which an electromagnetic wave in the predetermined frequency band can be transmitted and received most intensively. Note that the directions of the main beams 11 and 21 mean vector directions of the first antenna 1 and the second antenna 2 when transmitting electromagnetic waves, or vector directions of the first antenna 1 and the second antenna 2 when receiving electromagnetic waves. In FIG. 2, reference numerals 10 and 20 denote ranges of half-value angles centering around the main beams 11 and 21 formed by the first antenna 1 and the second antenna 2, respectively, as viewing the vehicle 100 in the direction normal to the horizontal plane. In other words, in FIG. 2, the directions of the main beams 11 and 21 formed by the first antenna 1 and the second antenna 2 as viewing the vehicle 100 in the direction normal to the horizontal plane substantially correspond to the central angles of the ranges 10 and 20 of the half-value angles centering around the respective main beams.

In this way, by setting the direction of the main beam 11 of the first antenna 1 to be different from the direction of the main beam 21 of the second antenna 2 as viewing the vehicle 100 in the direction normal to the horizontal plane, the reception sensitivity of electromagnetic waves arriving from all directions around the vehicle 100 can be improved.

Also, an angle formed by the direction of the main beam 11 of the first antenna 1 and the direction of the main beam 21 of the second antenna 2 as viewing the vehicle 100 in the direction normal to the horizontal plane will be referred to as $e_{12}$. In this case, the angle $\theta_{12}$ may be greater than or equal to 120° and less than or equal to 240°, favorably greater than or equal to 135° and less than or equal to 225°, more favorably greater than or equal to 150° and less than or equal to 210°, and even more favorably greater than or equal to 165° and less than or equal to 195°. By setting the angle $\theta_{12}$ in such a range, the reception sensitivity of the antenna system 101 for vehicles for electromagnetic waves arriving from all directions can be further improved.

Figure 3:
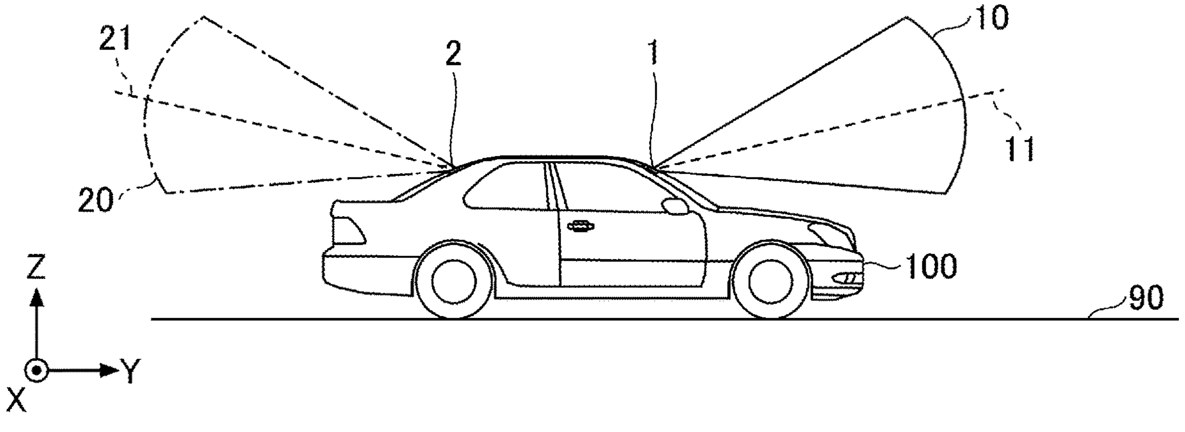
FIG. 3 is a diagram illustrating an example of directivities of antennas in a vertical plane.

FIG. 3 is a schematic diagram illustrating the ranges 10 and 20 of half-value angles centering around the main beams 11 and 21 of the first antenna 1 and the second antenna 2, respectively, as viewing the vehicle 100 in a side surface direction (YZ plane). In FIG. 3, an angle (elevation angle) of the main beam 11 with respect to a horizontal plane 90 is denoted as $\alpha$, and an angle (elevation angle) of the main beam 21 with respect to the horizontal plane is denoted as $\beta$. In this case, by setting the elevation angle $\alpha$ and the elevation angle $\beta$, for example, within an angle range of greater than or equal to 20° and less than or equal to 60°, the reception sensitivity for electromagnetic waves arriving from above and below the vehicle 100 can be improved. Also, the elevation angle α and the elevation angle β are favorably in an angular range of greater than or equal to −10° and less than or equal to 40°, and more favorably in an angular range of greater than or equal to −5° and less than or equal to 20°.

Figure 4:
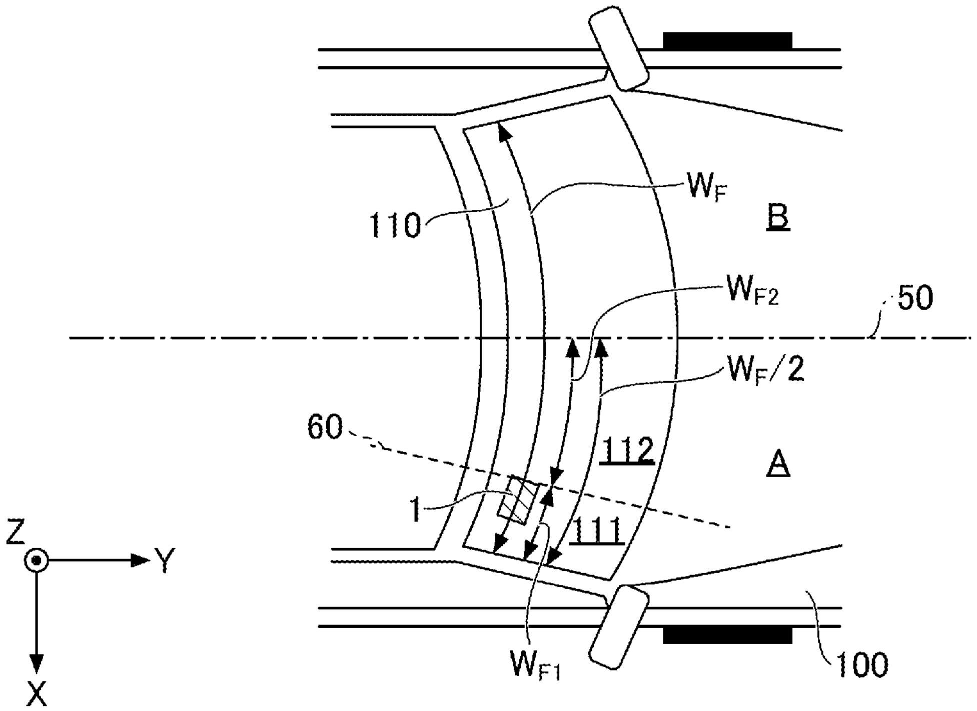
FIG. 4 is a diagram illustrating an example of an antenna arranged in the vicinity of a windshield as viewed from above a vehicle.

Next, a detailed arrangement of the first antenna 1 will be described. FIG. 4 is a schematic enlarged view illustrating part of the vehicle 100 including the windshield 110 as viewing the vehicle 100 in the direction normal to the horizontal plane. First, denoting a distance of the windshield 110 in the vehicle width direction passing through the first antenna 1 as $W_F$, a distance in the vehicle width direction in the region A is $W_F/2$. Then, dividing the region A by a front-side boundary line 60 substantially orthogonal to the vehicle width direction of the windshield 110, into a front-side first region 111 on the edge side (metal frame, for example, A-pillar) of the windshield 110 and a front-side second region 112 on the vehicle center axis 50 side, the first antenna 1 is arranged in the front-side first region 111.

In other words, the front-side boundary line 60 is a virtual line extending in a direction substantially orthogonal to the vehicle width direction passing through an end of the first antenna 1 opposite to the edge side of the windshield 110. In addition, the front-side boundary line 60 divides the windshield 110 arranged in the region A into the front-side first region 111 and the front-side second region 112. Here, $W_{F1}$ denotes a distance in the vehicle-width direction passing through the first antenna 1 in the front-side first region 111, whereas $W_{F2}$ denotes a distance in the vehicle-width direction in the front-side second region 112 on an extension line of $W_{F1}$. With these notations, the first antenna 1 may be arranged to make $W_{F1}/(W_{F1}+W_{F2})$ greater than or equal to 0.05 and less than or equal to 0.90. Note that a relationship of $W_{F2}=W_{F1}+W_{F2}$ holds.

Here, $W_{F1}/(W_{F1}+W_{F2})$ exceeds 0.90, there is a likelihood that the receiving sensitivity of the first antenna 1 on the vehicle-width direction side of the vehicle 100 will decrease. Further, if $W_{F1}/(W_{F1}\ W_{F2})$ exceeds 0.90, there is a likelihood that the first antenna 1 cannot be physically arranged because of closeness to the position of the housing that is arranged to house a camera, a rain sensor, or the like in the vicinity of a rearview mirror, and that the first antenna 1 interferes with the camera or the like thereby generating unnecessary noise. On the other hand, if, $W_{F1}/(W_{F1}+W_{F2})$ is less than 0.05, there is a likelihood that the first antenna 1 will come close to the metal frame (A-pillar) of the body of the vehicle 100, and thereby, disadvantageously reducing the antenna gain. Also, $W_{F1}/(W_{F1}+W_{F2})$ is favorably greater than or equal to 0.10 and less than or equal to 0.80, and more favorably greater than or equal to 0.10 and less than or equal to 0.70.

Figure 5:
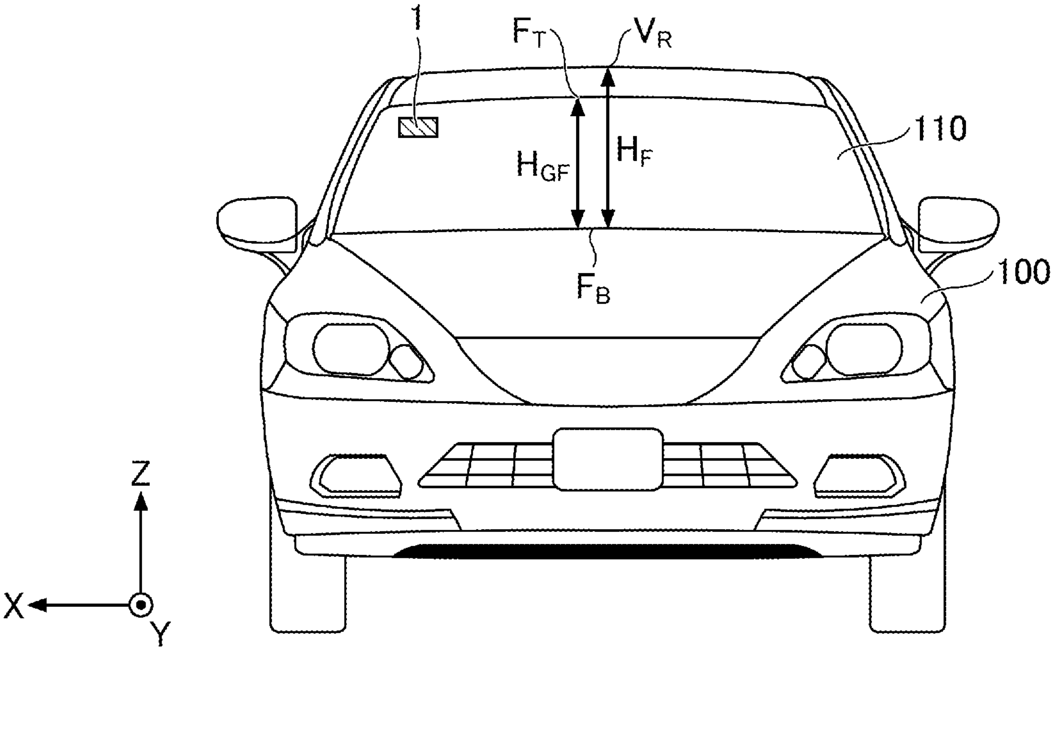
FIG. 5 is a diagram illustrating an example of an antenna arranged in the vicinity of a windshield as viewed from the front of a vehicle.

FIG. 5 is a front view of the vehicle 100 (on the XZ plane), i.e., as viewed in the Y-axis direction. Note that although the vehicle center axis 50 is omitted in FIG. 5, the left side with respect to a line (in the Z-axis direction) along the center of the vehicle 100 in the vehicle width direction is the region A, and the right side is the region B. In FIG. 5, a distance from a highest position $V_R$ of the roof to a lowest position $F_B$ of the windshield 110 in the front view of the vehicle 100, i.e., a distance in the vertical direction (Z-axis direction) is denoted as $H_F$. In this case, the first antenna 1 may be arranged within $0.5\times H_F$ from the position $V_R$, although the position depends on the specifications of the vehicle 100. If the first antenna 1 is arranged at a position exceeding $0.5\times H_F$ from the position $V_R$, there is a likelihood that the field of view of an occupant of the vehicle 100 will be blocked more than necessary, and there is a likelihood that the antenna gain will be reduced due to the influence of the ground, the hood of the vehicle, or the like. The first antenna 1 is favorably arranged within $0.4\times H_F$ from the position $V_R$, and more favorably arranged within $0.3\times H_F$ from the position $V_R$.

Also, in FIG. 5, a distance in a direction normal to the horizontal plane from a highest position $F_T$ of the windshield 110 to a lowest position $F_B$ of the windshield 110 in the front view of the vehicle 100, i.e., a distance in a vertical direction (Z-axis direction) is denoted as $H_{GF}$. in this case, the first antenna 1 may be arranged within $0.5\times H_{GF}$ from the position $F_T$, although the position depends on the specifications of the vehicle 100. If the first antenna 1 is arranged at a position exceeding $0.5\times H_{GF}$ from the position $F_T$, there is a likelihood that the field of view of an occupant in the vehicle 100 will be blocked more than necessary, and there is a likelihood that the antenna gain will be reduced due to the influence of the ground, the hood of the vehicle, or the like. Also, the first antenna 1 is favorably arranged within $0.4\times H_{GF}$ from the position $F_T$, and more favorably arranged within $0.3\times H_{GF}$ from the position $F_T$. Note that the first antenna 1 may be arranged adjacent to the height of the position $F_T$.

Figure 6:
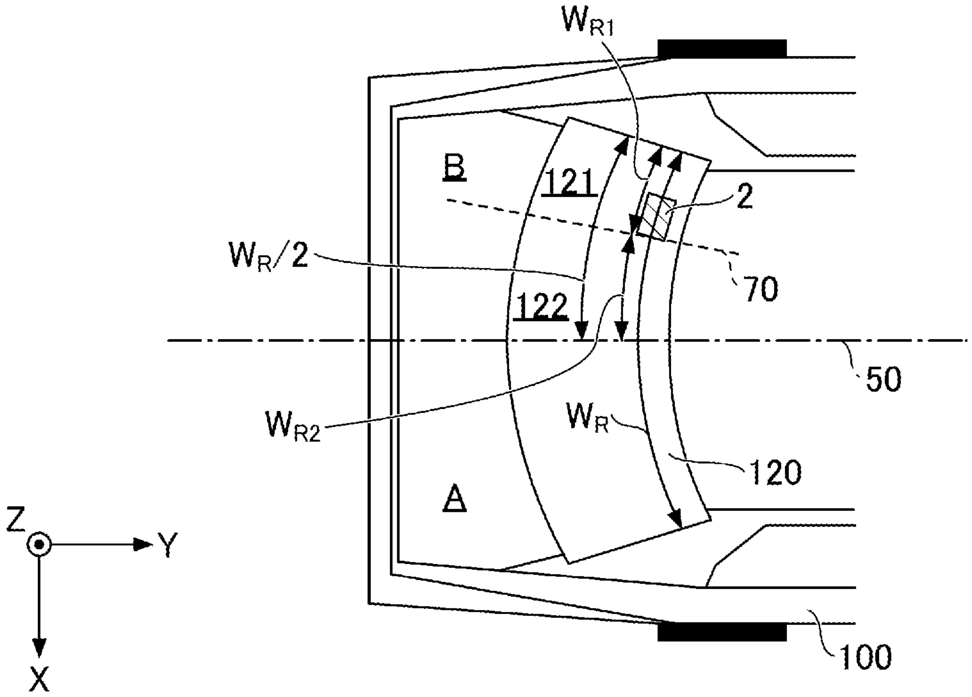
FIG. 6 is a diagram illustrating an example of an antenna arranged in the vicinity of a rear glass as viewed from above a vehicle.

Next, a detailed arrangement of the second antenna 2 will be described. FIG. 6 is a schematic enlarged view illustrating part of the vehicle 100 including the rear glass 120 as viewing the vehicle 100 in a direction normal to the horizontal plane. First, denoting the distance in the vehicle width direction of the rear glass 120 passing through the second antenna 2 as $W_R$, a distance in the vehicle width direction in the region B is $W_R/2$. Then, when dividing the region B by a rear-side boundary line 70 substantially orthogonal to the vehicle width direction of the rear glass 120, into a rear-side first region 121 on the edge side (metal frame (e.g., C-pillar)) side of the rear glass 120 and a rear-side second region 122 on the vehicle center axis 50 side, the second antenna 2 is arranged in the rear-side first region 121.

In other words, the rear-side boundary line 70 extends in a direction substantially orthogonal to the vehicle width direction passing through the end of the second antenna 2 on the side opposite to the edge side of the rear glass 120. Thus, the rear-side boundary line 70 divides the rear glass 120 arranged in the region B into the rear-side first region 121 and the rear-side second region 122. Here, let $W_{R1}$ denote a length in the vehicle-width direction passing through the second antenna 2 in the rear-side first region 121, and let $W_{R2}$ denote a length in the vehicle-width direction in the rear-side second region 122 on an extension line of $W_{R1}$. In this case, the second antenna 2 may be arranged so as to make $W_{R1}/(W_{R1}+W_{R2})$ less than or equal to 0.90. Note that a relationship of $W_R/2=W_{R1}+W_{R2}$ holds.

If $W_{R1}/(W_{R1}+W_{R2})$ exceeds 0.90, there is a likelihood that the receiving sensitivity of the second antenna 2 on the vehicle-width-direction side of the vehicle 100 will decrease. Further, if $W_{R1}/(W_{R1}+W_{R2})$ exceeds 0.90, there is a likelihood that the second antenna 2 will obstruct a back view; that the second antenna 2 cannot be physically arranged close to a lamp for the vehicle such as a high-mounted stop lamp; and that the second antenna 2 interferes with a camera or the like to generate unnecessary noise in the case of a vehicle equipped with a rear camera. Also, $W_{R1}/W_{R1}+W_{R2})$ is favorably less than or equal to 0.80, and more favorably less than or equal to 0.70.

Also, in the case where the second antenna 2 is provided in the vicinity of the vehicle interior side of the rear glass 120, $W_{R1}/(W_{R1}+W_{R2})$ is favorably greater than or equal to 0.05 and more favorably greater than or equal to 0.10. In this case, if $W_{R1}/(W_{R1}+W_{R2})$ is less than 0.05, there is a likelihood that the second antenna 2 will come close to a metal frame (e.g., C pillar) of the body of the vehicle 100, and thereby, disadvantageously reducing the antenna gain. Note that in the case where the second antenna is installed in an aerodynamic body part such as the rear spoiler described above, the second antenna can be arranged at a portion protruding toward the rear side of the vehicle 100 more than the metal frame; therefore, $W_{R1}/(W_{R1}+W_{R2})$ is not limited to be greater than or equal to 0.05 and less than or equal to 0.90, and the lower limit may be less than 0.05 or less than or equal to 0.03. In this case, as an example of $W_{R1}/(W_{R1}+W_{R2})$ being less than 0.05, a range of greater than or equal to 0.01 and less than or equal to 0.04 may be adopted.

Figure 7:
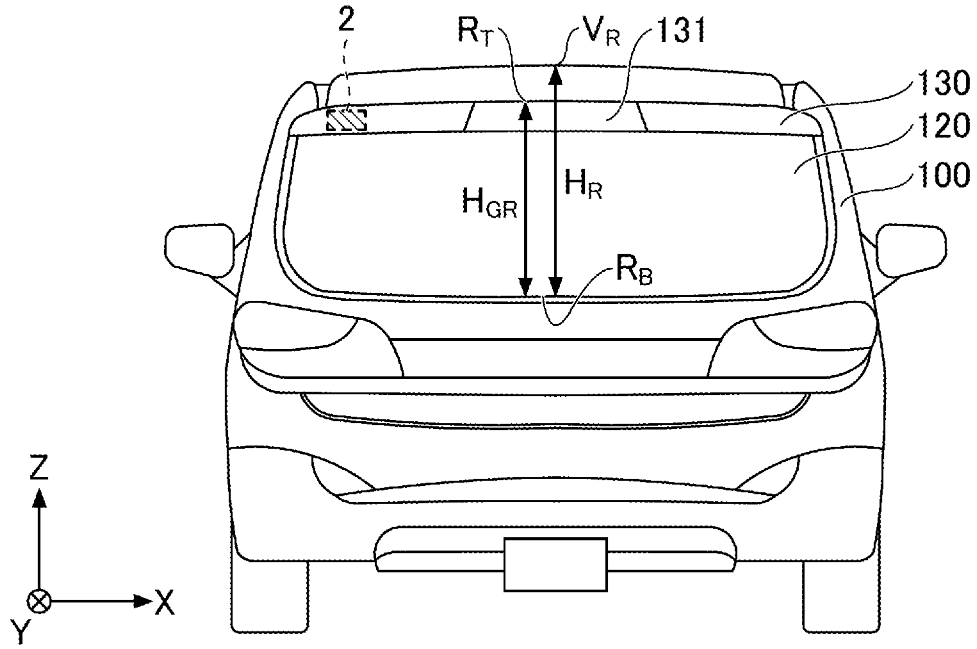
FIG. 7 is a diagram illustrating an example of an antenna arranged in the vicinity of a rear glass as viewed from the rear of a vehicle.

FIG. 7 is a schematic diagram (on the XZ plane) of a back view of the vehicle 100, i.e., as viewed in the Y-axis direction. Note that although the vehicle center axis 50 is omitted in FIG. 7, the right side with respect to a line (in the Z-axis direction) along the center of the vehicle 100 in the vehicle width direction is the region A, and the left side is the region B. In FIG. 7, a distance in a direction normal to the horizontal plane from the highest position $V_R$ of the roof to a lowest position $R_B$ of the rear glass 120 in the back view of the vehicle 100, i.e., a distance in the vertical direction (Z-axis direction) is denoted as $H_R$. In this case, the second antenna 2 may be arranged within $0.5\times H_R$ from the position $V_R$, although the position depends on the specifications of the vehicle 100. If the second antenna 2 is arranged at a position exceeding $0.5\times H_R$ from the position $V_R$, there is a likelihood that the field of view of the vehicle 100 will be blocked more than necessary, and there is a likelihood that the antenna gain will be reduced due to the influence of the ground, the body of the vehicle, or the like. Also, the second antenna 2 is favorably arranged within $0.4\times H_R$ from the position $V_R$, and more favorably arranged within $0.3\times H_R$ from the position $V_R$.

Also, in FIG. 7, a distance in a direction normal to the horizontal plane from a highest position $R_T$ of the rear glass 120 to the lowest position $R_B$ of the rear glass 120 in the back view of the vehicle 100, i.e., a distance in the vertical direction (Z-axis direction) is denoted as $H_{GR}$. In this case, the second antenna 2 may be arranged within $0.5\times H_{GR}$ from the position $R_T$, although the position depends on the specifications of the vehicle 100. If the second antenna 2 is arranged at a position exceeding $0.5\times H_{GR}$ from the position $R_T$, there is a likelihood that the field of view of an occupant of the vehicle 100 will be blocked more than necessary, and there is a likelihood that the antenna gain will be reduced due to the influence of the ground, the hood of the vehicle, or the like. Also, the second antenna 2 is favorably arranged within $0.3\times H_{GR}$ from the position $R_T$, and more favorably arranged within $0.1\times H_{GR}$ from the position $R_T$.

Also, the vehicle 100 in FIG. 7 is illustrated as an example that has a rear spoiler 130 above the rear glass 120, protruding toward the rear side (negative Y-axis direction) of the vehicle 100 along an inclined direction of the roof. Further, the rear spoiler 130 may include a lamp 131 for vehicles such as a high-mounted stop lamp at a center portion in the vehicle width direction. In the back view in FIG. 7, in the case where the rear glass 120 has a portion hidden by the rear spoiler 130 and the rear glass 120 has a portion exposed to the vehicle exterior side, the position $R_T$ of the rear glass 120 is assumed to be the highest position among positions at which the rear glass 120 is exposed to the vehicle exterior side. In this case, the vehicle 100 in FIG. 7 is an example in which the position $R_T$ at which the rear glass 120 is exposed to the vehicle exterior side is hidden by the rear spoiler 130 in the back view.

In this case, the second antenna 2 may be arranged within $0.5\times H_{GR}$ from the position $R_T$, although the position depends on the specifications of the vehicle 100. If the second antenna 2 is arranged at a position exceeding $0.5\times H_{GR}$ from the position $R_T$, there is a likelihood that the field of view of an occupant of the vehicle 100 will be blocked more than necessary, and there is a likelihood that the antenna gain will be reduced due to the influence of the ground, the hood of the vehicle, or the like. Also, the second antenna 2 is favorably arranged within $0.3\times H_{GR}$ from the position $R_T$, and more favorably arranged within $0.1\times H_{GR}$ from the position $R_T$.

Figure 8:
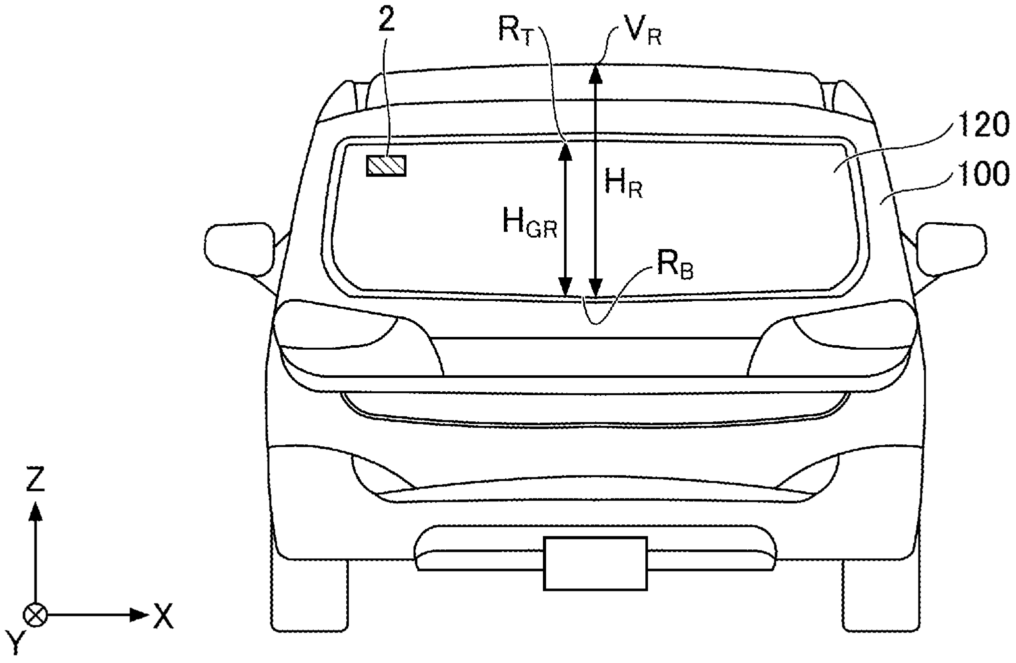
FIG. 8 is a diagram illustrating another example of the antenna arranged in the vicinity of the rear glass as viewed from the rear of the vehicle.

FIG. 8 is a back view of the vehicle 100 (on the XZ plane), i.e., a schematic view as viewed in the Y-axis direction, and the vehicle 100 is the same as the vehicle 100 illustrated in FIG. 7 except that the rear spoiler 130 as an example of an aerodynamic body part is not provided. Also in this case, the second antenna 2 may be arranged within $0.5\times H_R$ from the position $V_R$, favorably arranged within $0.3\times H_R$ from the position $V_R$, and more favorably arranged within $0.1\times H_R$ from the position $V_R$, although the position depends on the specifications of the vehicle 100.

Also, in FIG. 8, a distance in a direction normal to the horizontal plane from the highest position $R_T$ of the rear glass 120 to the lowest position $R_B$ of the rear glass 120 in the back view of the vehicle 100, i.e., a distance in the vertical direction (Z-axis direction) is denoted as $H_{GR}$. In this case, the second antenna 2 may be arranged within $0.5\times H_{GR}$ from the position $R_T$, although the position depends on the specifications of the vehicle 100. If the second antenna 2 is arranged at a position exceeding $0.5\times H_{GR}$ from the position $R_T$, there is a likelihood that the field of view of an occupant of the vehicle 100 will be blocked more than necessary, and there is a likelihood that the antenna gain will be reduced due to the influence of the ground, the hood of the vehicle, or the like. Also, the second antenna 2 is favorably arranged within $0.3\times H_{GR}$ from the position $R_T$, and more favorably arranged within $0.1\times H_{GR}$ from the position $R_T$.

Figure 9:
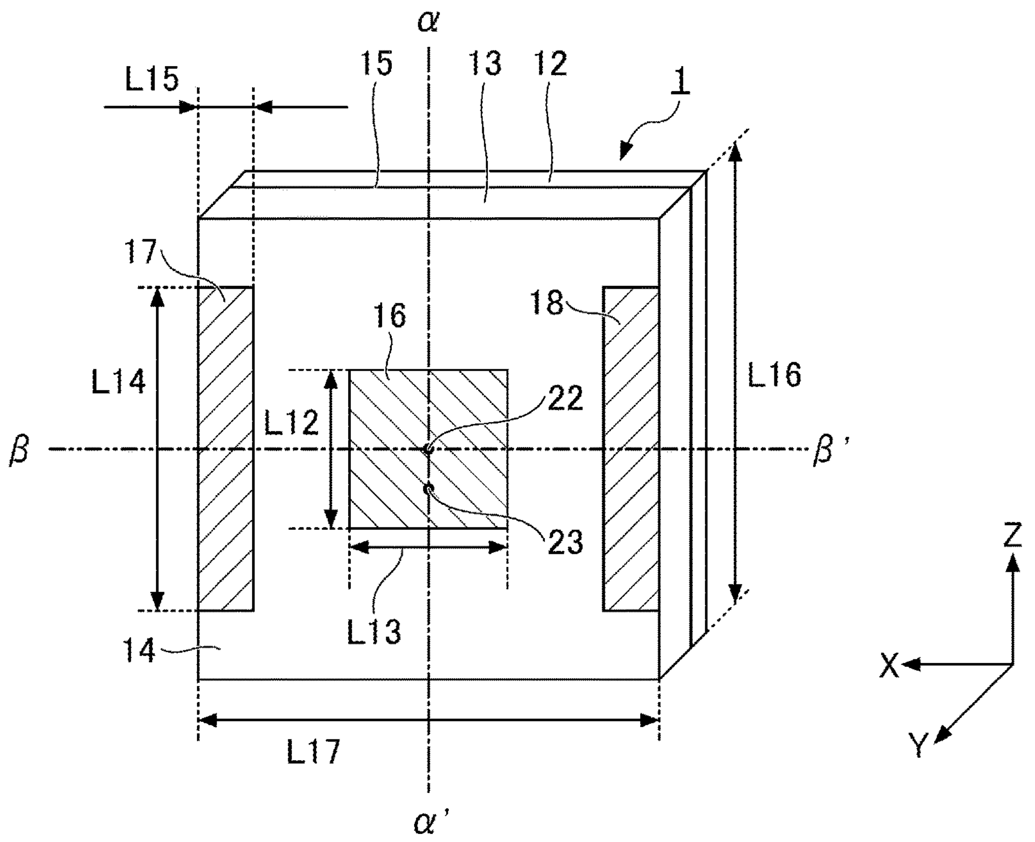
FIG. 9 is a schematic perspective view of an antenna.
Figure 10:
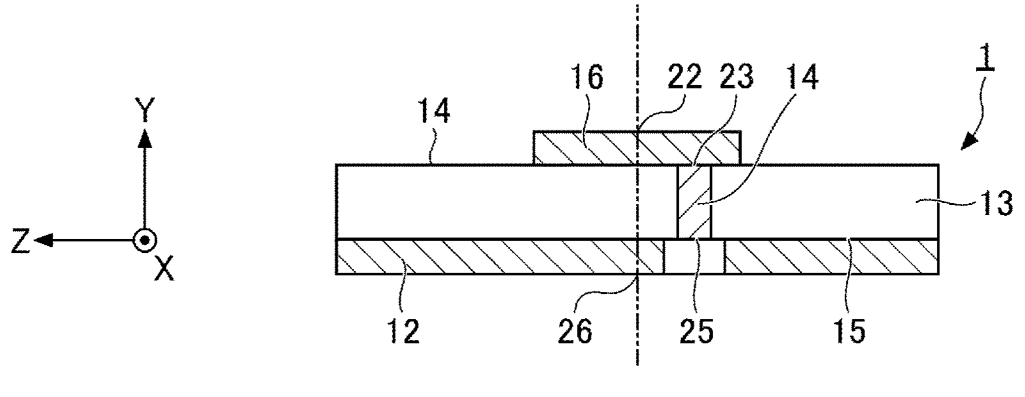
FIG. 10 is a schematic cross-sectional view of the antenna taken along a line α-α'.
Figure 11:
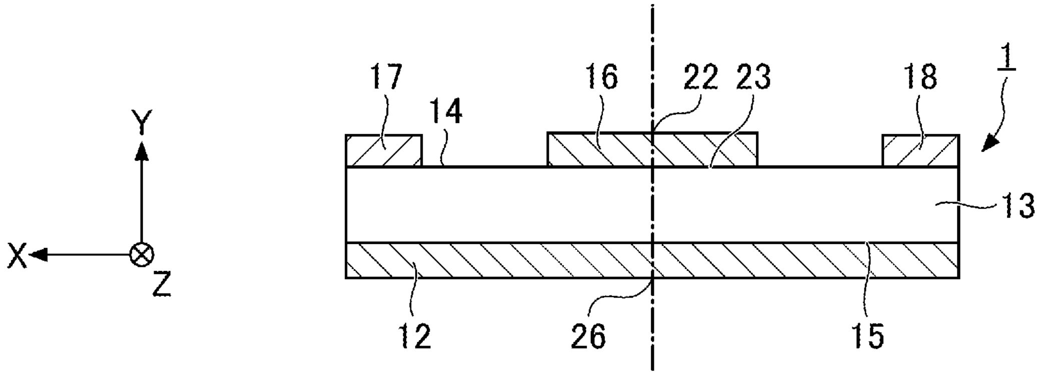
FIG. 11 is a schematic cross-sectional view of the antenna taken along a line β-β'.

Next, the first antenna 1 and the second antenna 2 will be described. The first antenna 1 and the second antenna 2 may be antennas having the same shape or antennas having shapes different from each other, as long as the first antenna 1 and the second antenna 2 can transmit and receive electromagnetic waves in the predetermined frequency F. Further, the first antenna 1 and the second antenna 2 may be capable of transmitting and receiving a predetermined polarized electromagnetic wave. For example, the first antenna 1 and the second antenna 2 may be formed so as to transmit and receive mainly a vertically polarized electromagnetic wave, may be formed so as to transmit and receive mainly a horizontally polarized electromagnetic wave, or may be formed so as to transmit and receive both a vertically polarized electromagnetic wave and a horizontally polarized electromagnetic wave with high sensitivity. FIG. 9 is a schematic perspective view illustrating an example of the first antenna 1; FIG. 10 is a schematic cross-sectional view of the first antenna 1 taken along a line α-α' (one-dot chain line) in FIG. 9; and FIG. 11 is a schematic cross-sectional view of the first antenna 1 taken along a line β-β' (two-dot chain line) in FIG. 9. Although the first antenna 1 illustrated in FIGS. 9 to 11 is what is known as a patch antenna, the first antenna 1 is not limited as such. Note that in FIG. 9, α-α' and β-β' are imaginary lines passing through the center of gravity 22 of a radiation plate 16 and are orthogonal to each other.

In FIGS. 9 to 11, the first antenna 1 includes the radiation plate 16, a first parasitic conductor plate 17, and a second parasitic conductor plate 18 on a first surface 14 of a dielectric base material 13, and includes a conductor plate 12 on a second surface 15 of the dielectric base material 13.

The radiation plate 16 is a plate-shaped or film-shaped conductor arranged to face the conductor plate 12 in the Y-axis direction, and the area is smaller than that of the conductor plate 12. The radiation plate 16 is a planar layer whose surface is parallel to the XZ plane, and functions as a radiation element of the first antenna 1. As the material of the conductor used for the radiation plate 16, for example, silver, copper, and the like may be enumerated, although not limited as such. Also, although the shape of the radiation plate 16 is a square, it may be another shape such as a polygon other than a square, a circle, or the like.

The radiation plate 16 is arranged apart from the conductor plate 12. The medium between the conductor plate 12 and the radiation plate 16 includes at least one of a space and a dielectric base material. FIGS. 9 and 10 illustrate a case where the medium is formed only of the dielectric base material 13. The dielectric base material 13 is a plate-shaped or film-shaped dielectric layer that includes a dielectric as the main component. The dielectric base material 13 has the first surface 14 and the second surface 15 opposite to the first surface 14. The first surface 14 and the second surface 15 are parallel to the XZ plane. In the dielectric base material 13, the radiation plate 16 is provided on the first surface 14, and the conductor plate 12 is provided on the second surface 15.

The dielectric base material 13 may be, for example, a dielectric base material such as a glass epoxy substrate, or a dielectric sheet. As the material of the dielectric used for the dielectric base material 13, glass such as quartz glass, ceramics, fluorine-based resin such as polytetrafluoroethylene, liquid crystal polymer, cycloolefin polymer, and the like may be enumerated, although not limited as such.

In the first antenna 1 illustrated in FIG. 10, a feeding portion 25 is a portion to which power is fed by contact feeding or non-contact feeding, and is or is close to a portion to which one end of a feeder line (not illustrated) is connected. As specific examples of the feeder line, a coaxial cable, a microstrip line, and the like may be enumerated. The other end of the feeder line is connected to a communication device that communicates with the outside of the vehicle by using the first antenna 1. The feeding portion 25 is positioned on the side where the conductor plate 12 is arranged with respect to the radiation plate 16.

A connection conductor 24 is not in contact with the conductor plate 12. The connection conductor 24 has its one end connected to the feeding portion 25, and has the other end connected to the radiation plate 16 at a connection point 23. The connection point 23 is displaced from a center of gravity 22 of the radiation plate 16, and in the illustrated case, is positioned on the negative side in the Z-axis direction with respect to the center of gravity 22. In the case where the radiation plate 16 has a symmetrical shape such as a square, the center of gravity 22 corresponds to the center of the symmetrical shape.

As specific examples of the connection conductor 24, a conductor formed inside a through hole penetrating the dielectric base material 13 in the Y-axis direction, a core wire of a coaxial cable, a conductor pin formed to have a pin shape, and the like may be enumerated; however, the connection conductor 24 is not limited as such. Note that in the case where the medium between the conductor plate 12 and the radiation plate 16 includes a space, as specific examples of the connection conductor 24, a core wire of a coaxial cable, a conductor pin, and the like may be enumerated; however, the connection conductor 24 is not limited as such.

As illustrated in FIG. 10, it is favorable that the center of gravity 22 of the radiation plate 16 overlaps a center of gravity 26 of the conductor plate 12 as viewed from a viewpoint on the radiation plate 16 side with respect to the conductor plate 12, because such an overlap improves the antenna gain of the first antenna 1 in a direction from the conductor plate 12 side toward the radiation plate 16 side. In this example, the viewpoint on the radiation plate 16 side with respect to the conductor plate 12 represents a viewpoint on the positive side in the Y-axis direction, and the direction from the conductor plate 12 side toward the radiation plate 16 side represents a direction toward the positive side in the Y-axis direction.

In FIGS. 9 and 11, the first parasitic conductor plate 17 and the second parasitic conductor plate 18 are conductors that are arranged apart from each other on both sides in the vehicle width direction (X-axis direction) of the vehicle with respect to the radiation plate 16. By having the first parasitic conductor plate 17 and the second parasitic conductor plate 18 arranged in this way, the antenna gain of the first antenna 1 in the vehicle width direction is improved. Note that the first antenna 1 may be provided with or may not be provided with the first parasitic conductor plate 17 and the second parasitic conductor plate 18. When the first antenna 1 is provided with the first parasitic conductor plate 17 and the second parasitic conductor plate 18, the antenna gain in the X-axis direction becomes relatively higher compared to the case of not being provided.

At least one of the first parasitic conductor plate 17 and the second parasitic conductor plate 18 is, for example, a planar layer whose surface is parallel to the XZ plane, and functions as a waveguide element or a reflection element of the first antenna 1. In this example, the first parasitic conductor plate 17 and the second parasitic conductor plate 18 are arranged on the same layer, and are positioned away from the center of gravity 22 of the radiation plate 16 as viewed from a viewpoint on the radiation plate 16 side with respect to the conductor plate 12.

In this example, although each of the first parasitic conductor plate 17 and the second parasitic conductor plate 18 has an area smaller than those of the conductor plate 12 and the radiation plate 16, the broadness and narrowness of the area is not limited as such. For example, at least one of the first parasitic conductor plate 17 and the second parasitic conductor plate 18 may have an area broader than the radiation plate 16.

As the material of the conductor used for the first parasitic conductor plate 17 and the second parasitic conductor plate 18, silver, copper, and the like may be enumerated; however, the material is not limited as such. Also, although the shapes of the first parasitic conductor plate 17 and the second parasitic conductor plate 18 illustrated in the figure are rectangles, the shapes may be other shapes such as polygons other than a square, a circle, or the like.

As viewed from a viewpoint on the radiation plate 16 side with respect to the conductor plate 12, it is favorable that the first parasitic conductor plate 17 and the second parasitic conductor plate 18 have line-symmetric shapes with respect to an axis of symmetry passing through the connection point 23 at which the connection conductor 24 is connected to the radiation plate 16, in terms of improving the antenna gain of the first antenna 1. In this example, the antenna gain of the first antenna 1 in the X-axis direction is improved.

The shape of the second antenna 2 may be the same as or different from that of the first antenna 1 as described above. In the case where the second antenna 2 has the same shape as the first antenna 1, the second antenna 2 has a configuration in which the positive and negative directions in the Y-axis direction are reversed from those of the first antenna 1 illustrated in FIGS. 9 to 11. In other words, the configuration of the second antenna 2 is the same as that of the first antenna 1 except that the direction from the conductor plate 12 toward the radiation plate 16 is oriented in the negative Y-axis direction.

Here, in the antenna system 101 for vehicles that includes the first antenna 1 and the second antenna 2 as illustrated in FIG. 1, as described above, the first antenna 1 is arranged in the vicinity of the windshield 110, and the second antenna 2 is arranged in the vicinity of the rear glass 120. In the case where the first antenna 1 and the second antenna 2 are patch antennas as illustrated in FIGS. 9 to 11, although the surface of the radiation plate 16 can be arranged to be parallel to the XZ plane, the arrangement is not limited as such.

In FIG. 1, the surface of the radiation plate 16 of the first antenna 1 may be inclined with respect to the XZ plane. For example, the surface of the radiation plate 16 of the first antenna 1 may be inclined from the X-axis direction (vehicle width direction) in a direction orthogonal to the horizontal plane. In this case, an angle ($\gamma_{y1}$) in a direction normal to the surface of the radiation plate 16 of the first antenna 1 with respect to the Y-axis direction as viewed in the Z-axis direction may be inclined within a range of −15° to +15°. Such an arrangement can be applied to the second antenna 2 in substantially the same way, as long as the second antenna 2 has the same shape as the first antenna 1.

Further, in FIG. 1, the surface of the radiation plate 16 of the first antenna 1 may be inclined with respect to the XY plane. In this case, an angle ($\gamma_{y2}$) in a direction normal to the surface of the radiation plate 16 of the first antenna 1 with respect to the Y-axis direction as viewed in the side surface direction (X-axis direction) of the vehicle 100 may be inclined within a range of −15° ~+15°. Such an arrangement can be applied to the second antenna 2 in substantially the same way, as long as the second antenna 2 has the same shape as the first antenna 1.

In this way, in the antenna system 101 for vehicles according to the present embodiment, as long as the first antenna 1 is arranged in the region A in the vicinity of the windshield 110, and the second antenna 2 is arranged in the region B in the vicinity of the rear glass 120, the direction normal to the surface of the radiation plate 16 of each of the antennas (the first antenna 1 and the second antenna 2) can be appropriately adjusted, for example, within the respective ranges of the angles $\gamma_{y1}$ and $\gamma_{y2}$. Further, the first antenna 1 and the second antenna 2 may be attached to a glass plate via a predetermined housing on the vehicle interior side of the windshield 110 and the rear glass 120, respectively, or may be attached to the ceiling on the vehicle interior side via the predetermined housing.

Further, the antenna system 101 for vehicles according to the present embodiment may have, other than the first antenna 1 and the second antenna 2, an antenna that is capable of transmitting and receiving a frequency band different from the frequency band F, arranged in the vicinity of at least one of the windshield 110, the rear glass 120, and a side glass (fixed window glass).

Example 1

In Example 1, the first antenna 1 illustrated in FIG. 9 was manufactured to implement the antenna system 101 for vehicles, in which the second antenna 2 having the same shape as the first antenna 1 was installed in the vehicle 100. Specifically, the first antenna 1 had the following dimensions (unit: mm). Note that a fluororesin substrate was used as the material of the dielectric base material 13, and copper was used as the material of the radiation plate 16, the first parasitic conductor plate 17, the second parasitic conductor plate 18, and the conductor plate 12.

L12: 22
L13: 18
L14: 16
L15: 2
L16: 24
L17: 29

The manufactured first antenna 1 was arranged in the region A in the vicinity of the windshield 110, and the second antenna 2 was arranged in the region B in the vicinity of the rear glass. In this case, in the first antenna 1 and the second antenna 2, the surface of the radiation plate 16 was attached to be parallel to the XZ plane (vehicle width direction). Further, the first antenna 1 was arranged in the front-side first region 111, specifically, at a mounting position in the vehicle-width direction at which $W_{R1}/(W_{R1}+W_{F2})$ was 0.6. Also, as for a mounting position in the vertical direction, the first antenna 1 was installed at a position $0.2\times H_F$ from the highest position $V_R$ of the roof, and $0.05\times H_{GF}$ from the highest position $F_T$ of the windshield 110. In this case, the angle α of the main beam 11 of the first antenna 1 with respect to the horizontal plane was approximately 0°.

The second antenna 2 was arranged in the rear-side first region 121, specifically, at a mounting position in the vehicle-width direction at which $W_{R1}/(W_{R1}+W_{R2})$ was 0.2. Also, as for a mounting position in the vertical direction, the second antenna 2 was installed at a position of $0.2\times H_R$ from the highest position $V_R$ of the roof and $0.05\times H_{GR}$ from the highest position $R_T$ of the rear glass 120. In this case, the angle β of the main beam 21 of the second antenna 2 with respect to the horizontal plane was approximately 0°. Note that an angle $\theta_{12}$ formed by the direction of the main beam 11 of the first antenna 1 and the direction of the main beam 21 of the second antenna 2 as viewed from a direction (Z-axis direction) normal to the horizontal plane was set to approximately 180°.

In the antenna system 101 for vehicles in Example 1, antenna characteristics of vertically polarized electromagnetic waves at 5.9 GHz included in the predetermined frequency band F were measured. Specifically, the antenna gain was measured by setting the center of the vehicle 100 around which the first antenna 1 and the second antenna 2 were attached as illustrated in FIG. 1, to the center of a turntable. Then, for vertically polarized electromagnetic waves transmitted from a transmission antenna fixed to the outside of the turntable, the antenna gain with respect to the vertically polarized electromagnetic waves was measured while changing the azimuth angle in the horizontal plane with respect to the antennas.

Figure 12:
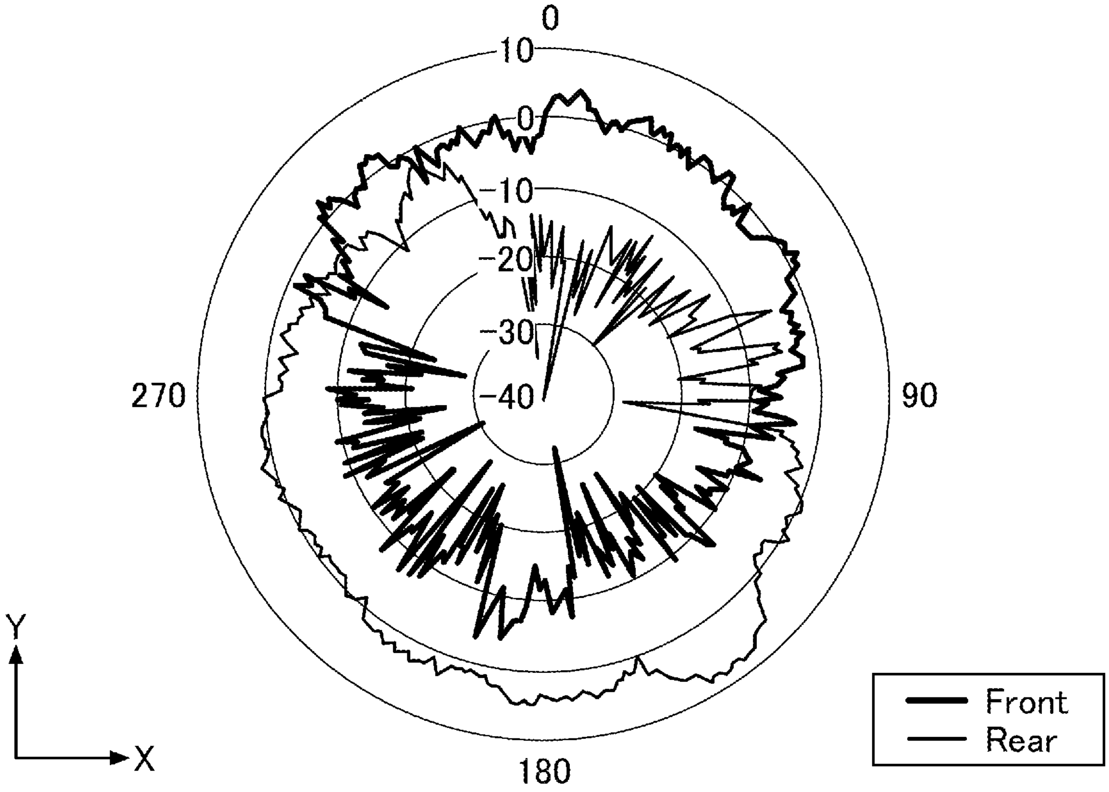
FIG. 12 is a diagram illustrating measurement results of antenna gain in a horizontal direction in Example 1.

FIG. 12 is a result of plotting of the antenna gain of the vertically polarized electromagnetic waves measured at 5.9 GHz (unit: dBi) in the case where the azimuth angle was changed from 0° to 360° by intervals of 1° in Example 1. As illustrated in FIG. 12, in the antenna system 101 for vehicles according to the present embodiment, the only one position where the antenna gain was less than −5 dBi from 0° to 360° in the horizontal plane of the vehicle 100 was found in the vicinity of 90°, and a predetermined antenna gain could be secured over the horizontal plane.

Comparative Example 1

Figure 13:
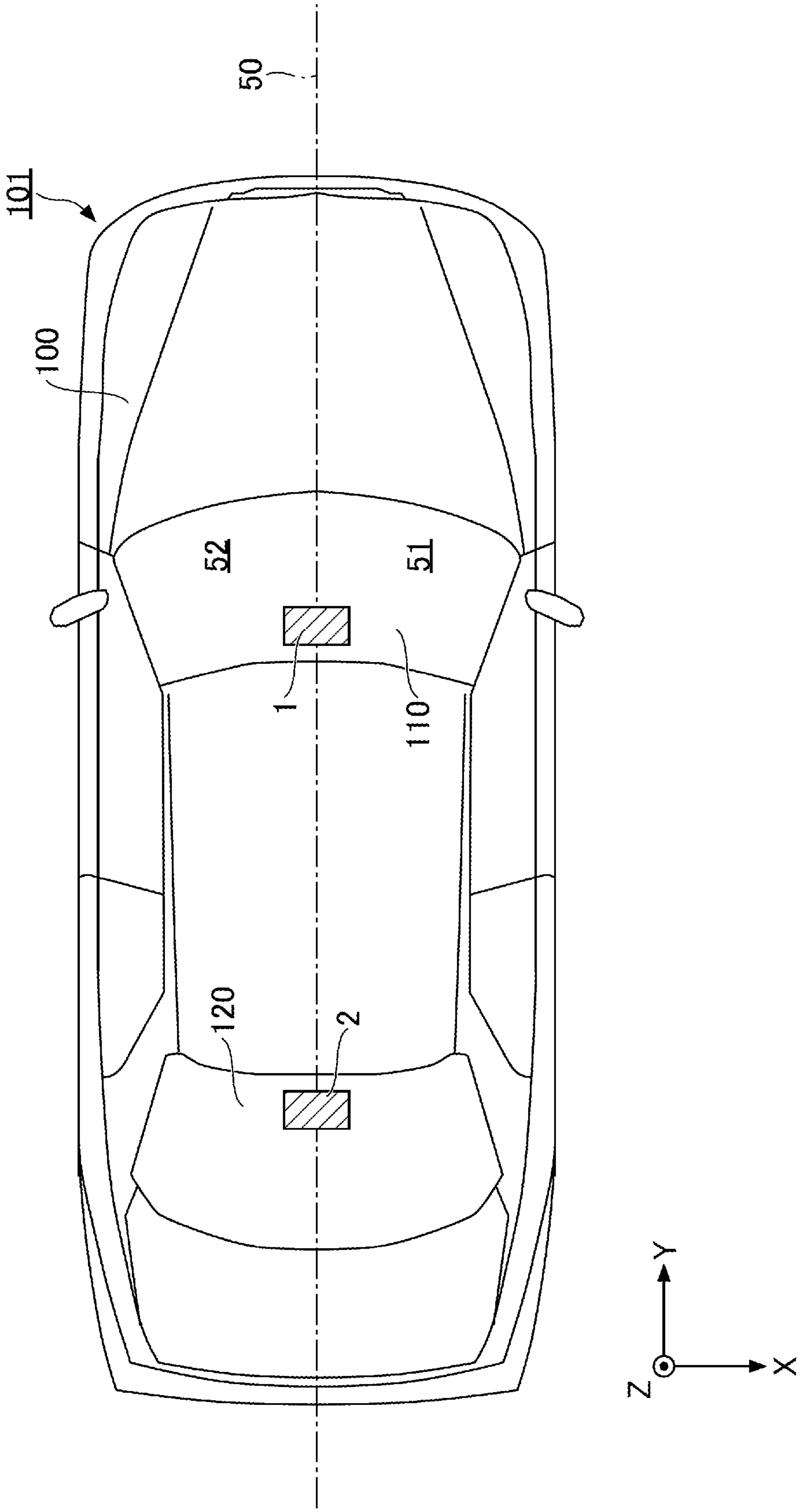
FIG. 13 is a top view of a vehicle equipped with an antenna system for vehicles in Comparative Example 1.

In Comparative Example 1, although the first antenna 1 and the second antenna 2 having the same shapes as those in Example 1 were used, in contrast to Example 1, the positions of the first antenna 1 and the second antenna 2 in the vehicle width direction were arranged on the vehicle center axis 50. In other words, both the first antenna 1 and the second antenna 2 were arranged in both the region A and the region B across the vehicle center axis 50. Note that FIG. 13 is a schematic diagram illustrating an arrangement of the first antenna 1 and the second antenna 2 in the antenna system 101 for vehicles in Comparative Example 1. Note that the mounting positions of the first antenna 1 and the second antenna 2 in the vertical direction were the same as in Example 1.

Figure 14:
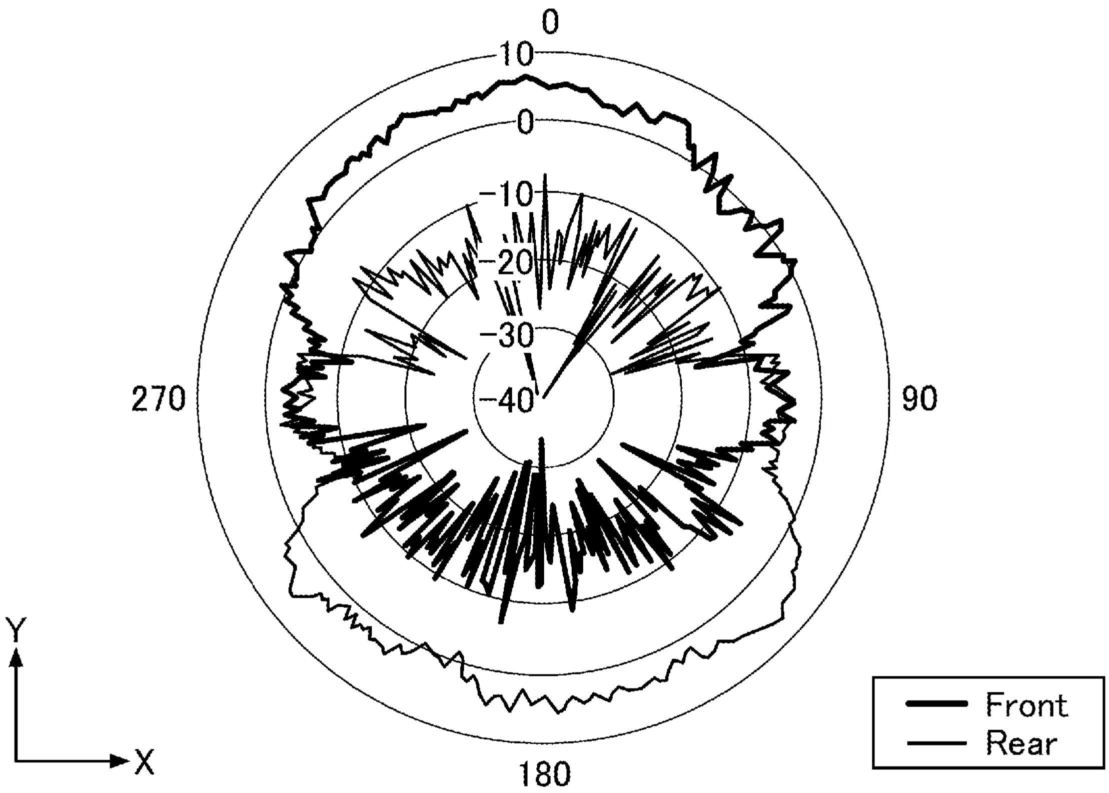
FIG. 14 is a diagram illustrating measurement results of the antenna gain in a horizontal direction in Comparative Example 1.

FIG. 14 is a result of plotting the antenna gain (unit: dBi) of vertically polarized electromagnetic waves measured at 5.9 GHz in the case where the azimuth angle was changed from 0° to 360° by intervals of 1° in Comparative Example 1. As illustrated in FIG. 14, the antenna system 101 for vehicles in Comparative Example 1 had three positions in total at which the antenna gain became less than −5 dBi, including one position in the vicinity of 90° and two positions in the vicinity of 270° from 0° to 360° in the horizontal plane of the vehicle 100, and the predetermined antenna gain could not be secured over the horizontal plane.

The invention claimed is:

1. An antenna system for vehicles, comprising:

a first antenna attached in a vicinity of a windshield of a vehicle; and a second antenna attached in a vicinity of a rear glass of the vehicle, wherein the first antenna and the second antenna are configured to transmit and receive an electromagnetic wave in a predetermined frequency band F, and wherein, defining a region A and a region B with respect to a vehicle center axis extending in a traveling direction of the vehicle, so as to bisect a vehicle width of the vehicle from a viewpoint in a direction normal to a horizontal plane, the first antenna is arranged in the region A, and the second antenna is arranged in the region B, wherein, defining a front-side boundary line that is orthogonal to a vehicle width direction of the windshield in the region A as viewed from the viewpoint in the direction normal to the horizontal plane, defining a region between the front side boundary line and an edge side of the windshield on the region A side, as a front-side first region, and defining a region between the vehicle center axis and the front side boundary line, as a front-side second region, the first antenna is arranged in the front-side first region, and wherein, denoting a width of the front-side first region and a width of the front-side second region in the vehicle width direction passing through the first antenna as $W_{F1}$ and $W_{F2}$, respectively, $W_{F1}/(W_{F1}+W_{F2})$ is greater than or equal to 0.05 and less than or equal to 0.90, wherein, denoting a distance from a lowest position of the windshield to a highest position of a roof of the vehicle in the direction normal to the horizontal plane in a front view of the vehicle as $H_F$, the first antenna is arranged within a range from the highest position of the roof to $0.5\times H_F$, and wherein the frequency band F includes 5.9 GHz.

2. The antenna system for vehicles as claimed in claim 1, wherein in the vicinity of the windshield, an antenna capable of transmitting and receiving the predetermined frequency band F is only the first antenna, and wherein in the vicinity of the rear glass, an antenna capable of transmitting and receiving the predetermined frequency band F is only the second antenna.

3. The antenna system for vehicles as claimed in claim 1, wherein defining a rear-side boundary line that is orthogonal to a vehicle width direction of the rear glass in the region B as viewed from the viewpoint in the direction normal to the horizontal plane, defining a region between the rear-side boundary line and an edge side on the region B side of the rear glass as a rear-side first region, and defining a region between the vehicle center axis and the rear-side boundary line is denoted as a rear-side second region, the second antenna is arranged in the rear-side first region, and wherein, denoting a width of the rear-side first region and a width of the rear-side second region in the vehicle width direction passing through the second antenna as $W_{R1}$ and $W_{R2}$, respectively, $W_{R1}/(W_{R1}+W_{R2})$ satisfies to be less than or equal to 0.90.

4. The antenna system for vehicles as claimed in claim 1, wherein, denoting a distance from the lowest position of the windshield to a highest position of the windshield in the direction normal to the horizontal plane in the front view of the vehicle as $H_{GF}$, the first antenna is arranged within a range from the highest position of the windshield to $0.5\times H_{GF}$.

5. The antenna system for vehicles as claimed in claim 1, wherein, denoting a distance from a lowest position of the rear glass to the highest position of the roof of the vehicle in the direction normal to the horizontal plane as $H_R$, the second antenna is arranged within a range from the highest position of the roof to $0.5\times H_R$.

6. The antenna system for vehicles as claimed in claim 5, wherein the second antenna is arranged in an aerodynamic body part attached to a vehicle exterior side relative to the rear glass.

7. The antenna system for vehicles as claimed in claim 6, wherein the aerodynamic body part is a spoiler.

8. The antenna system for vehicles as claimed in claim 1, wherein the second antenna is arranged on a vehicle interior side of the rear glass, and wherein, denoting a distance from a lowest position of the rear glass to a highest position of the rear glass in the direction normal to the horizontal plane as $H_{GR}$, the second antenna is arranged within a range from the highest position of the rear glass to $0.5\times H_{GR}$.

9. The antenna system for vehicles as claimed in claim 1, wherein at least one of the first antenna and the second antenna is a patch antenna.

* * * * *